United States Patent
Gupta et al.

(10) Patent No.: US 11,622,293 B2
(45) Date of Patent: Apr. 4, 2023

(54) METHODS, SYSTEMS, AND COMPUTER READABLE MEDIA FOR ESTABLISHING MESSAGE PRIORITY IN NETWORK SLICES BASED ON QUALITY OF SERVICE PARAMETERS

(71) Applicant: Oracle International Corporation, Redwood Shores, CA (US)

(72) Inventors: Nitin Gupta, Bangalore (IN); Anup Shivarajapura, Bangalore (IN); Sathish Kumar Prabhakaran, Bangalore (IN); Raghuvamshi Vasudev Singh Thakur, Bangalore (IN); Venkatesh Aravamudhan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 47 days.

(21) Appl. No.: 17/348,389

(22) Filed: Jun. 15, 2021

(65) Prior Publication Data
US 2022/0400401 A1 Dec. 15, 2022

(51) Int. Cl.
*H04W 28/02* (2009.01)
*H04L 47/70* (2022.01)
*H04W 28/16* (2009.01)

(52) U.S. Cl.
CPC ......... *H04W 28/0268* (2013.01); *H04L 47/70* (2013.01); *H04W 28/16* (2013.01)

(58) Field of Classification Search
None
See application file for complete search history.

(56) References Cited

U.S. PATENT DOCUMENTS

| 10,616,802 | B2 | 4/2020 | Krishan et al. | |
| 2021/0385283 | A1* | 12/2021 | Talebi Fard | H04W 12/06 |
| 2021/0410059 | A1* | 12/2021 | Talebi Fard | H04W 40/02 |
| 2022/0330085 | A1* | 10/2022 | Li | H04L 67/565 |

FOREIGN PATENT DOCUMENTS

| KR | 20220005936 A | * | 1/2022 |
| WO | WO 2018/141945 A1 | | 8/2018 |

OTHER PUBLICATIONS

Cisco—Wireless Priority Services, 2021 (Year: 2021).*

(Continued)

*Primary Examiner* — Andre Tacdiran
(74) *Attorney, Agent, or Firm* — Jenkins, Wilson, Taylor & Hunt, P.A.

(57) ABSTRACT

A method for establishing message priority in network slices based on quality of service (QoS) parameters includes receiving, by a network slice configuration service provider entity and from a network slice management service provider entity, a network slice creation notification message containing at least a QoS profile corresponding to a created network slice, utilizing the QoS profile to derive a service based interface (SBI) message priority (SMP) associated with the network slice, and providing the SMP to a requesting access and mobility management function (AMF) entity in response to receiving a network slice selection request message from the AMF entity, wherein the AMF entity assigns the SMP level value to network traffic directed to the network slice.

20 Claims, 5 Drawing Sheets

(56) References Cited

OTHER PUBLICATIONS

"3rd Generation Partnership Project; Technical Specification Group Services and System Aspects; System Architecture for the 5G System (5GS); Stage 2 (Release 17)," 3GPP TS 23.501, V17.0.0, pp. 1-489 (Mar. 2021).

"3rd Generation Partnership Project; Technical Specification Group Core Network and Terminals; Network Slice Selection Services; Stage 3 (Release 17)," 3GPP TS 29.531, V17.0.0, pp. 1-77 (Mar. 2021).

"3GPP TS 28.801; 3rd Generation Partnership Project; Technical Specification Group Services and System Aspects; Telecommunication management; Study on management and orchestration of network slicing for Next Generation Network; (Release 15)," 3GPP TS 28.801, V15.1.0, pp. 1-75 (Jan. 2018).

"3rd Generation Partnership Project; Technical Specification Group Services and System Aspects; Management and Orchestration; Provisioning; (Release 16)," 3GPP TS 28.531, V16.9.0, pp. 1-73 (Mar. 2021).

Notification of Transmittal of the International Search Report and the Written Opinion of the International Searching Authority, or the Declaration for International Application No. PCT/US2022/031572 (Sep. 8, 2022).

"3rd Generation Partnership Project; Technical Specification Group Core Network and Terminals; 5G System; Technical Realization of Service Based Architecture; Stage 3 (Release 16)," 3GPP TS 29.500, V16.7.0), pp. 1-91, (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; Architecture enhancements to facilitate communications with packet data networks and applications (Release 16)," 3GPP TS 23.682, V16.10.0, pp. 1-135 (Sep. 2021).

"3rd Generation Partnership Project; Technical Specification Group Core Network and Terminals; 5G System; Network Exposure Function Northbound APIs; Stage 3 (Release 16)," 3GPP TS 29.522, V16.9.0, pp. 1-185 (Sep. 2021).

"3rd Generation Partnership Project; Technical Specification Group Core Network and Terminals; T8 reference point for Northbound APIs; (Release 16)," 3GPP TS 29.122, V16.11.0, pp. 1-408 (Sep. 2021).

Commonly-Assigned, Co-pending U.S. Appl. No. 17/685,159 for "Methods, Systems, and Computer Readable Media for Notification Delivery," (Unpublished, filed Mar. 2, 2022).

"3rd Generation Partnership Project; Technical Specification Group Core Network and Terminals; 5G System; Network Function Repository Services; Stage 3 (Release 17)," 3GPP TS 29.510 V17.6.0, pp. 1-306 (Jun. 2022).

"3rd Generation Partnership Project; Technical Specification Group Core Network and Terminals; 5G System Session Management Policy Control Service; Stage 3; (Release 17)," 3GPP TS 29.512 V17.7.0, pp. 1-255 (Jun. 2022).

Commonly-Assigned, Co-pending U.S. Appl. No. 17/960,800 for "Methods, Systems, and Computer Readable Media for Adjusting and Using Priorities of Service/Notification Request Messages at Network Functions with Multiple Slice Support," (Unpublished, filed Oct. 5, 2022).

* cited by examiner

| 401 | 402 | 403 | 404 | 405 |
|---|---|---|---|---|
| 0 | 10ms | 2% | $10^{-6}$ | $10^{-6}$ |
| 1 | 50ms | 2% | $10^{-6}$ | $10^{-4}$ |
| 2 | 100ms | 2% | $10^{-6}$ | $10^{-2}$ |
| ... | 10ms | 5% | $10^{-5}$ | $10^{-6}$ |
| ... | 100ms | 2% | $10^{-6}$ | $10^{-3}$ |
| 31 | 300ms | 2% | $10^{-2}$ | $10^{-6}$ |

FIG. 4

METHODS, SYSTEMS, AND COMPUTER READABLE MEDIA FOR ESTABLISHING MESSAGE PRIORITY IN NETWORK SLICES BASED ON QUALITY OF SERVICE PARAMETERS

TECHNICAL FIELD

The subject matter described herein relates to quality of service (QoS) in 5G networks. More particularly, the subject matter described herein relates to methods, systems, and computer readable media for establishing message priority in network slices based on QoS parameters.

BACKGROUND

In 5G telecommunications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of Internet protocol (IP) address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

One example of an NF that provides services to user equipment (UE) devices, such as Internet of Things (IoT) devices, is the access and mobility management function (AMF). The AMF provides registration management, connection management, reachability management, mobility management, and other services for UE devices. The AMF serves as the point of contact between the radio access network and the remaining nodes in the 5G core network. The AMF also serves as the point of access to network slice services.

Network slicing is a service provided in 5G networks where network resources are logically allocated in portions or slices for use by UE devices. Each network slice may provide particular capabilities or services to a UE. A network slice instance is defined as a set of network functions and the resources for the network functions which are arranged and configured to form and meet a specific set of network requirements or characteristics. For example, a network slice instance for access network services may be resources of a virtualized g-Node B and AMF to provide access network services for a UE. A network slice instance for a core network service may include resources of a virtualized NRF and network exposure function (NEF) configured to provide core network services for a UE, such as an IoT, digital call sessions, and the like.

In 5G telecommunications networks, it may be desirable to implement policies that guarantee quality of service for different traffic classes. Third Generation Partnership Project (3GPP) Technical Specification (TS) 29.500 defines an SBI-message-priority mechanism where 5G consumer NFs can set a parameter referred to as 3GPP-SBI-message-priority in the hypertext transfer protocol (HTTP) header in a message that is used to indicate the priority of the message. Section 6.8.1 of 3GPP TS 29.500 states that the service based interface (SBI) message priority can be used to provide guidance to a 5G core network function acting as an HTTP/2 client, server, or proxy would make throttling decisions relating to overload control. The priority information may also be used for routing and proxies. A server may also use the priority information to process higher priority requests before lower priority requests.

The priority mechanism is the above mentioned 3GPP-SBI-message-priority parameter that is carried in a custom HTTP header and is used to carry message priority between the client and the server. The custom HTTP header enforces the message priority end to end between the client and the server. HTTP/2 clients and servers are required to support the custom HTTP header to enforce the priority mechanism. The 3GPP-SBI-message-priority parameter carried in the custom HTTP header can be used to set message level priority or stream priority. Message level priority is used by an HTTP client or server to indicate the priority of a request from the client or response from the server. Stream level priority is used to prioritize streams for transmitting frames when there is limited capacity for sending and to express how the sender would prefer the peer to allocate the resources when managing concurrent streams. Setting a stream priority ensures a priority treatment to a message between two endpoints of an HTTP/2 connection.

One problem with using the SBI message priority HTTP header mechanism defined in 3GPP TS 29.500 is that there are no guidelines available for the ability to determine and/or establish a SBI message priority value at the network slice level or layer. Rather, the standard simply allows the 5G network functions derive and determine their own message priorities. As such, scenarios of signaling messaging characterized by inconsistent and/or unavailable priority assignments may exist across the network for the users.

Accordingly, in light of these difficulties, there exists a need for methods, systems, and computer readable media for establishing message priority in network slices based on QoS parameters.

SUMMARY

A method for establishing message priority in network slices based on QoS parameters includes receiving, by a network slice configuration service provider entity and from a network slice management service provider entity, a network slice creation notification message containing at least a QoS profile corresponding to a created network slice, utilizing the QoS profile to derive a service based interface (SBI) message priority (SMP) associated with the network slice, and providing the SMP to a requesting access and mobility management function (AMF) entity in response to receiving a network slice selection request message from the AMF entity, wherein the AMF entity assigns the SMP value to the network traffic directed to the network slice.

According to another aspect of the method described herein, the network slice management service provider entity is a network slice management function (NSMF) and the network slice configuration service provider entity is a network slice selection function (NSSF).

According to another aspect of the method described herein, the QoS profile is generated from required QoS parameters provided by a communication service management function (CSMF) entity to network slice management service provider entity.

According to another aspect of the method described herein, the network slice configuration service provider entity includes a mapping table that maps QoS parameters to SMP level values.

According to another aspect of the method described herein, the SMP data is provided to the AMF in a network slice selection response message. According to another aspect of the method described herein, the network slice configuration service provider entity derives the SMP level value by determining a closest match between the mapped QoS parameters in the mapping table and QoS parameters in the QoS profile.

According to another aspect of the method described herein, the SMP level value is inserted in an SBI message priority section of a header of the network traffic directed to the network slice.

According to another aspect of the subject matter described herein, a system for establishing message priority in network slices based on QoS parameters includes a network slice configuration service provider entity including at least one processor and a memory. The system further includes a priority management engine stored in the memory and implemented by the at least one processor for receiving, from a network slice management service provider entity, a network slice creation notification message containing at least a QoS profile corresponding to a created network slice, utilizing the QoS profile to derive a SMP associated with the network slice, and providing the SMP to a requesting AMF entity in response to receiving a network slice selection request message from the AMF entity, wherein the AMF entity assigns the SMP level value to the network traffic directed to the network slice.

According to another aspect of the system described herein, the network slice management service provider entity is a NSMF and the network slice configuration service provider entity is a NSSF.

According to another aspect of the system described herein, the QoS profile is generated from required QoS parameters provided by a CSMF entity to network slice management service provider entity.

According to another aspect of the system described herein, the network slice configuration service provider entity includes a mapping table that maps QoS parameters to SMP level values.

According to another aspect of the system described herein, the SMP data is provided to the AMF in a network slice selection response message. According to another aspect of the system described herein, the network slice configuration service provider entity derives the SMP level value by determining a closest match between the mapped QoS parameters in the mapping table and the QoS parameters in the in the QoS profile.

According to another aspect of the system described herein, the SMP level value is inserted in an SBI message priority section of a header of the network traffic directed to the network slice.

According to another aspect of the subject matter described herein, a non-transitory computer readable medium having stored thereon executable instructions that when executed by a processor of a computer control the computer to perform steps comprising. The steps include receiving, by a network slice configuration service provider entity and from a network slice management service provider entity, a network slice creation notification message containing at least a QoS profile corresponding to a created network slice, utilizing the QoS profile to derive a SMP associated with the network slice, and providing the SMP to a requesting AMF entity in response to receiving a network slice selection request message from the AMF entity, wherein the AMF entity assigns the SMP level value to the network traffic directed to the network slice.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 is a SMP priority mapping table that contains different SMP level values and associated mapped QoS parameter values according to an embodiment of the subject matter described herein;

DETAILED DESCRIPTION

Figure 1:
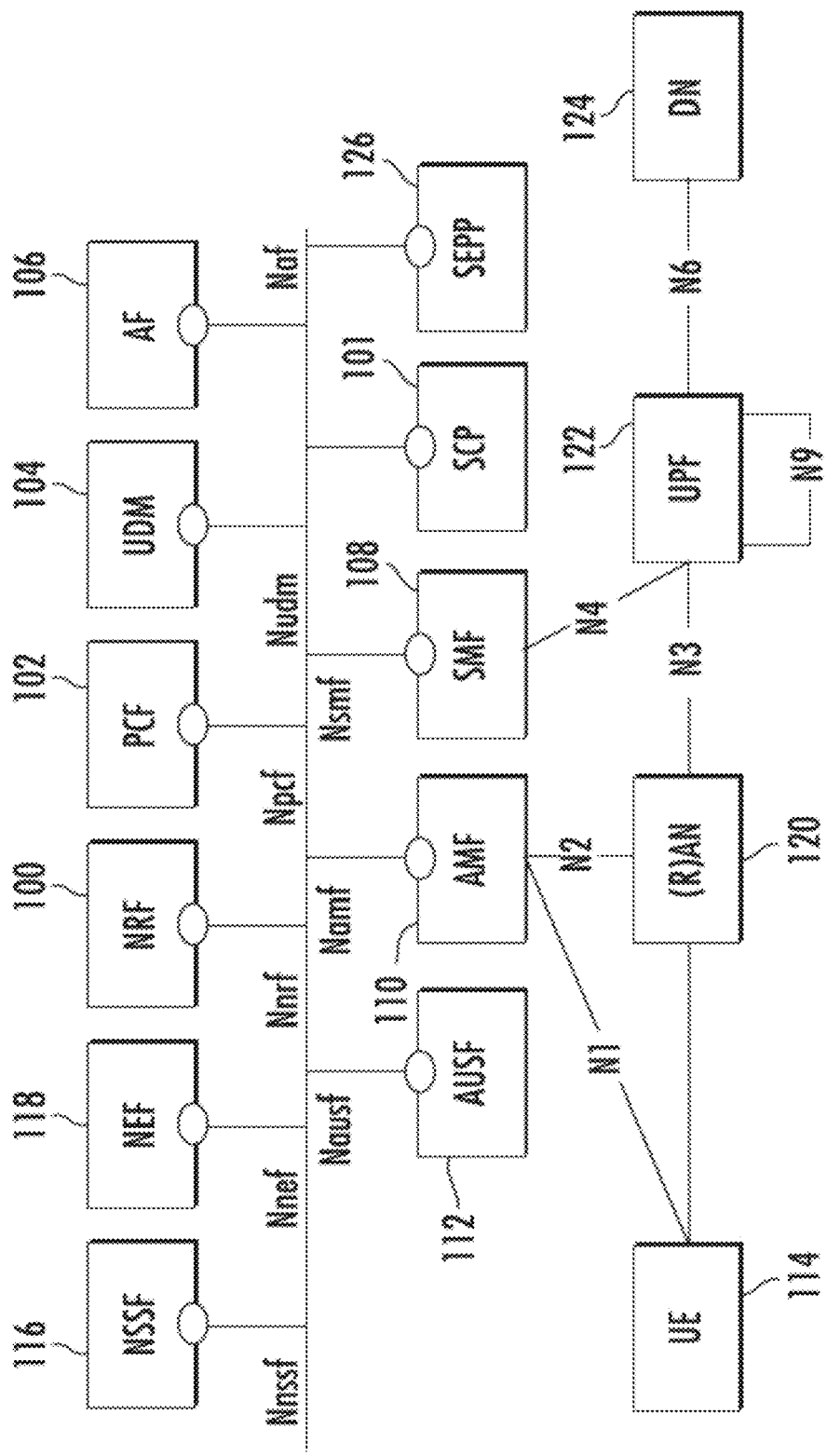
FIG. 1 is a network diagram illustrating an exemplary 5G network architecture according to an embodiment of the subject matter described herein.

FIG. 1 is a block diagram illustrating an exemplary 5G system network architecture. In FIG. 1, the network includes NRF 100 and a service communications proxy (SCP) 101. As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are consuming or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between AMF 110 and PCF 102. AMF 110 performs mobility and registration management operations similar to those performed by a mobility management entity (MME) in 4G networks. AMF 110 also serves as the access point for network slice services. AMF 110 may also perform AMF selection to select the serving AMF that will provide access to the network slice services requested by a UE during registration.

An authentication server function (AUSF) 112 performs authentication services for user equipment (UEs), such as UE 114, seeking access to the network.

A network slice selection function (NSSF) 116 provides network slice subnet availability information (NSSAI) and NS selection services for devices seeking to access specific network capabilities. NSSF 116 may obtain AMF loading information from an NRF and NSSAI availability information from AMFs. NSSF 116 may store the AMF loading information and NSSAI availability information in an AMF selection database maintained by NSSF 116. When NSSF 116 receives an NSSAI selection request from an AMF, NSSF 116 may utilize the stored AMF loading and NSSAI availability information to compute an AMF relevance score and a weight for each AMF capable of supporting the network slice services requested by a UE seeking access to network slice services. NSSF 116 may generate a prioritized list of AMFs capable of providing the requested services and the corresponding weights and communicate the list to the requesting AMF. The requesting AMF may then use the prioritized list of AMFs and the weights to select an AMF for providing access to the requested network slice services.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionalities for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Service edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse a minimum of two SEPP functions, one for the home PLMN and the other for the foreign PLMN.

As indicated above, network slicing involves providing virtual network functions and allocating resources for the virtual network functions to meet a given requirement. For example, network slicing may involve virtualizing any of the network functions illustrated in FIG. 1 and providing access to services implemented by multiple different network functions as a network slice instance.

At the highest level, network slices are accessible via communication services provided by a communication service provider. Communication services can include business to consumer communication services, such as mobile web browsing, voice over LTE calling, and rich communication services. Communication services can also include business to business services, such as Internet access and local area network (LAN) interconnection.

Network slice as a service can be offered by communication services providers to their customers. Network slice services can be characterized by a number of parameters, including: radio access technology, bandwidth, end-to-end latency, guaranteed/non-guaranteed QoS, security level, etc.

Figure 2:
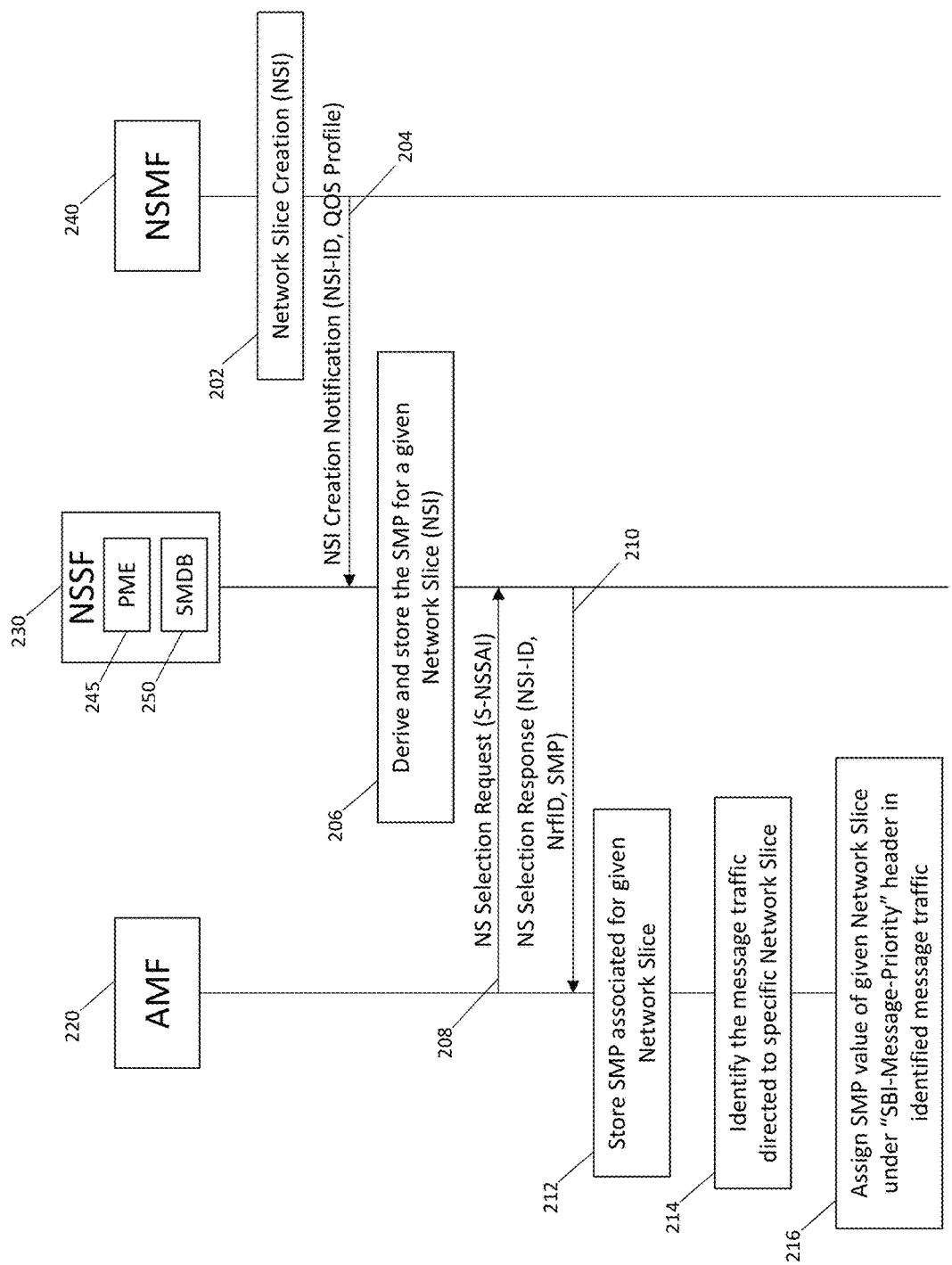
FIG. 2 is a message flow diagram illustrating the communication of a service based interface (SBI) message priority (SMP) level value for a network slice according to an embodiment of the subject matter described herein.

FIG. 2 depicts a signaling diagram of an exemplary 5G communications network configured for establishing a message priority in network slices based on quality of service (QoS) parameters. In some embodiments, a network operator may request allocation of a network slice instance (NSI) for a network slice service type via an NSI creation request. Notably, the allocation request includes NSI related requirements. For example, the network operator can utilize a user interface associated with a network slice configuration service provider entity (e.g., NSMF 240) to submit NSI related requirements in a NSI creation request. In some embodiments, a communication service management function (CSMF) can be utilized to submit a network slice instance creation request, which contains the NSI related requirements, to the NSMF. In some embodiments, NSI related requirements may correspond to different required parameter levels pertaining to QoS parameter categories, such as latency/delay, delay tolerance, jitter, reliability, and/or the like. The NSI related requirements provided by the network operator or CSMF can be used to define the degree to which a network slice instance is to provide an established quality of service to user flows (e.g., a digital call session) communicated over the network slice instance. In particular, the NSI related requirements and associated QoS parameter values will ultimately establish or define the SBI message priority (SMP) level values of message traffic communicated by a requesting user equipment and/or network functions (NFs) via the network slice.

In some embodiments, the network operator and/or CSMF can define a NSI related requirement level for each of the QoS parameter categories in which the network slice is to be serviced. In some embodiments, the QoS parameter categories include: latency/delay, delay tolerance, jitter, and reliability. Furthermore, each of the QoS parameter categories can be assigned an NSI related requirement "level" such as 'ultra-low', 'low', 'medium', 'high', and 'ultra-high'. Although five NSI related requirement levels are described herein, any number of levels can be utilized without departing from the scope of the disclosed subject matter.

Figure 3:
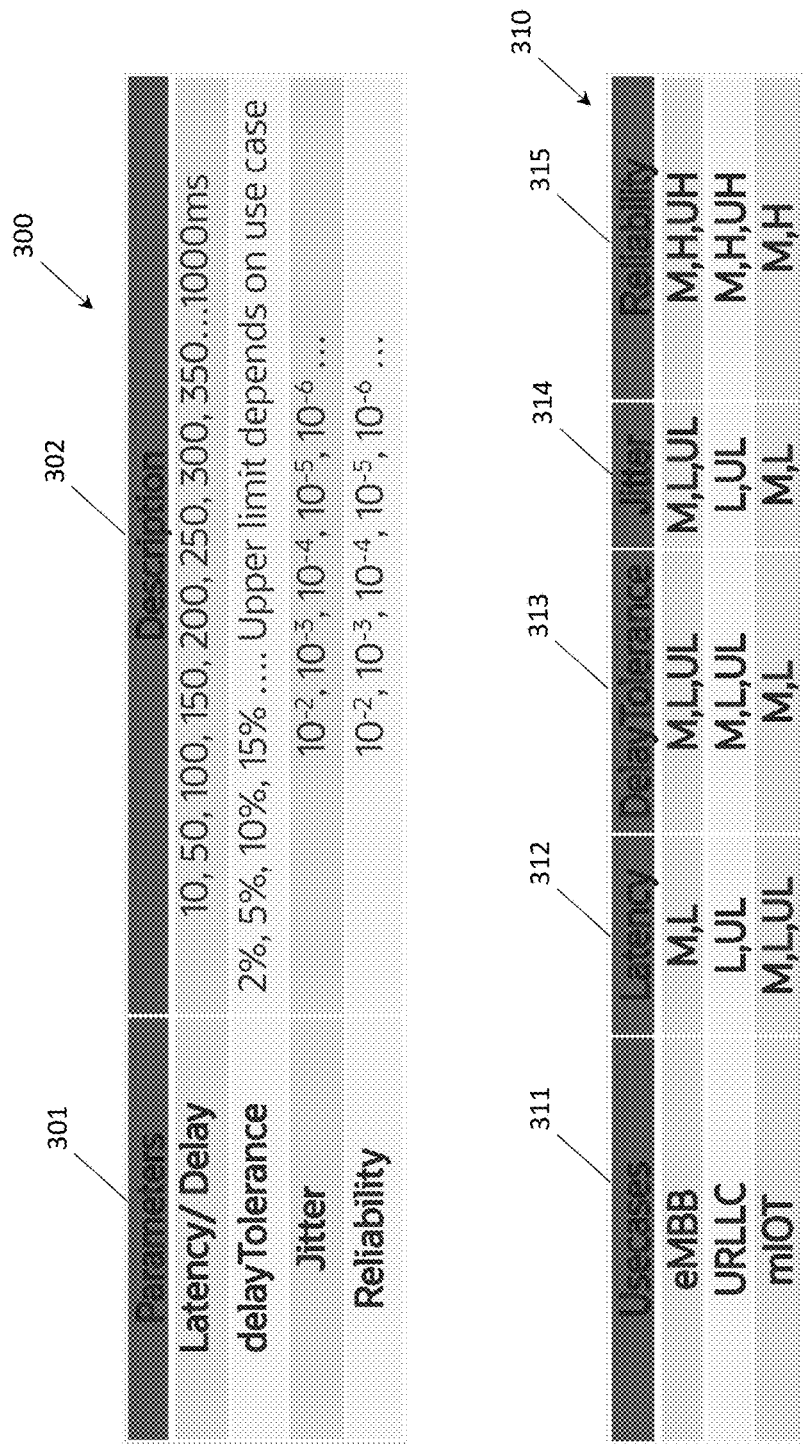
FIG. 3 depicts a table of exemplary quality of service (QoS) parameters and corresponding values and a use case mapping table according to an embodiment of the subject matter described herein.

After receiving the defined NSI related requirements (and corresponding NSI related requirement levels) from a network operator and/or CSMF, NSMF 240 is triggered to create a network slice instance in block 202. During this network slice instance creation stage, NSMF 240 can be configured to define the QoS parameter numerical values corresponding to the NSI related requirement levels established by the network operator. In some embodiments, NSMF 240 can using a QoS parameter value table or algorithm that maps QoS parameter numerical values to NSI related requirement levels. If the NSI related requirement levels provided by a network operator and/or CSMF indicated that a network slice instance required a 'high' level of latency/delay, a 'low' level of delay tolerance, a 'medium' level of jitter, and a 'medium' level of reliability, NSMF 240 may be configured to reference the QoS parameter value table or algorithm to subsequently assign the appropriate QoS parameter numerical values. For example, NSMF 240 may determine, based on the aforementioned submitted NSI related requirement levels, a network slice instance to be created should be allocated with QoS parameter values including a 350 millisecond latency/delay, a 15% delay tolerance, a $10^{-5}$ packet error rate (PER) of jitter, and $10^{-5}$ packet loss ratio (PLR) of reliability. Notably, any combination of QoS parameter values can be established. For example, FIG. 3 illustrates an table 300 of exemplary quality of service (QoS) parameters in column 301 and example numerical parameter values in column 302. In some embodiments, the network operator and/or CSMF may provide the QoS parameter values directly to the NSMF 240 (as opposed to NSMF determining the QoS parameter values). In some embodiments, these QoS parameter values can be grouped together to form a QoS profile for the created network slice instance.

Although the following description pertains to a single use case pertaining to a general call session establishment, the disclosed subject matter can be utilized in a number of unique applications and use cases. For example, the disclosed system and method for establishing message priority in 5G network slices based on QoS parameters can be applied to various industries (e.g., mIOT, URLLC), to various consumers, to various health care entities (e.g., eMBB, URLLC), smart city applications (e.g., eMBB, mIOT), augmented reality and virtual reality (AR/VR) applications (e.g., eMBB, URLLC), transport applications (e.g., mIOT, URLLC), public safety applications (e.g., mIOT, URLLC, eMBB) and the like. In some embodiments, the network operator and/or CSMF may provide a use case identifier or code that corresponds to one of the aforementioned applications to NSMF 240 instead of the NSI related requirement levels. In such a scenario, NSMF 240 may utilize a "use case to QoS mapping" table or database to determine predefined NSI related requirement levels. For example, use case-QoS mapping table 310 in FIG. 3 provides a number of use cases in column 311. Further, column 311-315 provide for various QoS parameters, such as latency, delay tolerance, jitter, and reliability, respectively. For example, if a use case identifier "eMBB" was provided to NSMF 240, the NSMF would be configured to define NSI related requirement levels as i) latency=medium, low, ii) delay tolerance =medium, low, and ultra-low, iii) jitter =medium, low, ultra-low, and iv) reliability =medium, high, ultra-high. NSMF 240 would then subsequently determine (numerical) QoS parameter values for the use case application in the manner described above.

After determining the numeric quality of service parameter values, NSMF 240 can be configured to construct a network slice instance in accordance with the QoS parameter values (see block 202). After the new network slice instance is created, NSMF 240 can also be configured to generate the QoS profile that contains all of the determined QoS parameter values. The generated QoS profile is also associated with the NSI identifier of the newly created network slice instance. Notably, the NSI identifier and QoS profile can be stored together locally in the NSMF 240 or in some other database that is accessible by NSMF 240.

In some embodiments, the disclosed subject matter also can pertain to the creation and/or assignment of network slice subnet instances (which can also be included in the QoS profile). For example, after NSMF 240 receives the request for allocation of the network slice instance with certain characteristics (i.e., network slice instance related requirements), NSMF 240 is triggered to create a new network slice instance and its associated network slice subnet instances. More specifically, NSMF 240 can be configured to decide on the constituent NSSIs and the topology of the network slice instance to be created using the information from a network slice template. For the constituent NSSIs, NSMF 240 can derive network slice subnet related requirements from the received network slice related requirements. If reconfiguration of the transport network is needed, NSMF 240 can derive transport network related requirements from the network slice related requirements. For the required NSSIs, NSMF 240 can also be configured to send network slice subnet related requirements to a network slice subnet management function (NSSMF) to request allocations of the required NSSIs. NSMF 240 may also send QOS attributes included in the network slice instance subscription data to the NSSMF.

After the new network slice instance is created in block 202, NSMF 240 can be configured (e.g., triggered) to generate and send a NSI creation notification message 204 (e.g., a notifyMOICreation message) to a network slice management service provider entity, such as NSSF 203. In particular, the NSI creation notification message 204 is directed to NSSF 230 and includes the NSI identifier and the QoS profile corresponding to the created network slice instance (e.g., obtained from the local database by the NSMF). The NSI creation notification message 204 also serves as a request to register the new network slice instance with NSSF 230.

After receiving NSI creation notification message 204, the network slice management service provider entity, e.g., NSSF 230, may be configured to register the network slice instance. As shown in FIG. 2, NSSF 230 may include a priority management engine (PME) 245 that is responsible for determining service based interface (SBI) message priority (SMP) level values for network slices. In some embodiments, PME 245 may comprise a software algorithm, program, or script that resides in memory and is executed by a processor of NSSF 230 (or an underlying computing host device). Although not shown in FIG. 2, NSSF 230 may include a processor and memory components. For example, In some embodiments, PME 245 and/or NSSF 230 may be configured extract and use the QoS profile included in notification message 204 to derive a SMP level value for the created network slice instance (e.g., see block 206). As used herein, the SMP level value can be used to establish a priority level for all communications (e.g., message traffic) traversing from a registered user equipment (UE) over the network slice instance (as described in greater detail below). In some embodiments, the SMP level value can be used to serve as a default priority level for message traffic communicated via the network slice instance and/or replace a default priority level for message traffic communicated by the UE via the network slice instance.

In some embodiments, PME 245 in NSSF 230 can parse and extract the QoS parameter values from the QoS profile contained in notification message 204. Once the QoS parameter values are extracted, PME 245 and/or NSSF 230 can be configured to access a local SMP mapping database 250 that includes entries containing various SMP level values (e.g., 32 different SMP level values), which are respectively mapped to a plurality of QoS parameter value combinations. An exemplary SMP mapping database 250 is illustrated as an SMP mapping table 400 is depicted in FIG. 4. Notably, PME and/or 250 may utilize SMP mapping table 400 to determine and/or derive the SMP level value associated with the new network slice instance.

In particular, FIG. 4 illustrates SMP mapping table 400 that includes an SMP level value column 401, a delay/latency column 402, a delay tolerance column 403, a jitter column 404, and a reliability column 405. In some embodiments, each entry of SMP mapping table 400 includes a mapping between an SMP level value (i.e., the value listed in column 401) and a combination of values contained in columns 402-405. For example, an entry containing a combination of QoS parameter values that includes 50 ms of delay/latency, 2% delay tolerance, $10^{-6}$ jitter, and $10^{-4}$ reliability is mapped to a SMP level value of "1" in SMP mapping table 400. In such a scenario, PME 245 and/or NSSF 230 is configured to store (in a separate 'supported NSI list' database) the derived SMP level value of '1' along with the NSI identifier for the created network slice instance. As indicated above, SMP mapping table 400 may include 32 separate SMP level values (i.e., SMP level values '0' through '31') and corresponding database entries. Although 32 separate SMP level values are used, any number of SMP level values can be utilized without departing from the scope of the disclosed subject matter. As indicated above, after determining and/or deriving the SMP level value for the network slice instance, NSSF 230 is configured to store the SMP level value and the corresponding NSI identifier in an accessible database, e.g., the supported NSI list database.

Returning to FIG. 2, in some embodiments, NSSF 230 and/or PME 245 can subsequently receive a network slice selection request message 208 from an AMF entity, such as AMF 220. Notably, network slice selection request message 208 may include single-network slice selection assistance information (S-NSSAI) that contains data indicative of a requested slice and service type (SST).

In some embodiments, network slice selection request message 208 is sent from AMF 220 in response to the AMF receiving a session request containing an S-NSSAI from a user equipment (UE) that is attempting to establish a digital call session via a service supported by a requested network slice (e.g., as identified by S-NSSAI). Notably, AMF 220 is configured to perform the initial registration and protocol data unit (PDU) session establishment for the requesting user equipment. For example, AMF 220 is configured to send network slice selection request message 208 to NSSF 230 in order to retrieve the NRF identifier and the NSI identifier as part of the initial UE registration and PDU establishment (e.g., call session) procedure.

In response to receiving network slice selection request message 208, PME 245 and/or NSSF 230 extracts and utilizes the S-NSSAI to determine the appropriate network slice instance to be assigned to support the service type requirements indicated in network slice selection request message 208. Afterward identifying and assigning the appropriate network slice instance, PME 245 and/or NSSF 230 generates and sends a network slice selection response message 210 to provide network slice instance information to AMF 220. In some embodiments, network slice selection response message 210 includes a network slice instance identifier (NSI-ID), a NRF identifier (NrfId), and the SMP level value associated with the NSI identifier that can be used to establish the PDU session (e.g., digital call) for the requesting user equipment.

After receiving the network slice selection response message 210, AMF 220 parses response message 210 and extracts the NSI-ID and corresponding SMP level value. AMF 220 then stores the NSI-ID and its SMP level value in a local database (e.g., a supported NSSAI list) for subsequent message processing via the network slice instance. In addition, AMF 220 will be configured to begin detecting/identifying any incoming message traffic that is directed from the registered user equipment to the assigned network slice instance. Upon identifying message traffic (e.g., one or more packets) that is directed to the assigned network slice instance, AMF 220 will modify the message traffic packet to include the SMP level value (as stored/indicated in the AMF's supported NSSAI list). For example, AMF 220 can be configured to assign the SMP level value (that is mapped to the network instance identifier associated to the assigned network slice instance) to each of the ingress message traffic packets originating from the UE. More specifically, AMF 220 may assign and/or insert the stored SMP level value into the "SBI-Message-Priority" section of the message header (e.g., HTTP header) of each identified message traffic packet directed to the network slice instance by the UE. As such, message traffic originating from the user equipment that is directed to the network slice instance is communicated with a priority that corresponds to the priority level indicated by the inserted SMP level value.

Figure 5:
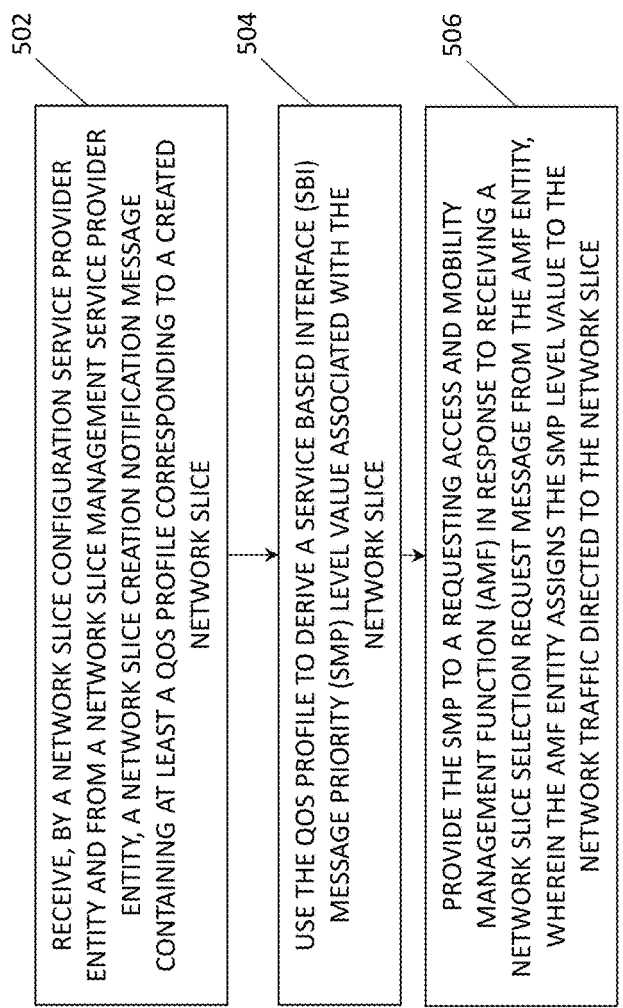
FIG. 5 is a flow chart illustrating an exemplary process for establishing message priority in network slices based on QoS parameters according to an embodiment of the subject matter described herein.

FIG. 5 is a flow chart illustrating an exemplary process or method 500 for establishing message priority in network slices based on QoS parameters according to an embodiment of the subject matter described herein. In some embodiments, method 500 depicted in FIG. 5 is an algorithm, program, or script (e.g., PME 245 shown in FIG. 2) stored in memory that when executed by a processor performs the steps recited in blocks 502-506.

In block 502, a network slice management service provider entity receives, a network slice creation notification message that contains at least a quality of service profile corresponding to a created network slice. In some embodiments, the NSSF receives a network slice instance creation notification message (e.g., a notifyMOICreation message) from an NSMF in response to the creation of a new network slice instance by the NSMF. In some embodiments, the network slice creation notification message includes a QOS profile and a network slice instance identifier corresponding to the newly created network slice instance.

In block 504, the QoS profile is used to derive a SMP level value associated with the network slice. In some embodiments, the NSSF can be configured to extract the quality of service parameters included in the QoS profile of the received network slice creation notification message. In particular, the NSSF and/or an PME can access a SMP mapping database that contains a plurality of entries that map SMP level values to various combinations of QoS parameter values. For example, the SMP management engine can be configured to cross-reference the QoS parameter values extracted from the QoS profile with the QoS values included in the entries of the SMP mapping database. In particular, the SMP management engine is configured to find an entry that includes QoS values that match the QoS profile parameter values. If the SMP management engine cannot find an entry that contains an exact match, the SMP management engine is configured to designate an entry representing a closest match to the QoS profile parameter values. In some embodiments, the SMP management engine can designate an entry if a majority (e.g., 3 out of 4) of the QoS parameters in the database entry match the QoS profile parameter values. After a match (or closest match) is determined, the mapped SMP level value is identified and subsequently stored along with the corresponding network slice instance identifier in the NSSF by the PME.

In block 506, the SMP level value is provided to a requesting AMF entity in response to receiving a network slice selection request message. In some embodiments, the NSSF receives from an AMF a network slice selection request message containing an S-NSSAI that identifies a requested network slice and/or service type. In response to receiving the request message from the AMF, the NSSF is configured to send a network slice selection response message with the network slice instance identifier, NRF identifier, and SMP level value associated with an appropriate network slice (that corresponds to the request network slice service type).

After receiving the network slice selection response message, the AMF is configured to extract and store the SMP level value associated with a network slice instance. The AMF may subsequently identify message traffic that is directed to the specific network slice from a registered UE. In such scenarios, the AMF is configured to assign the SMP level value to network traffic that is directed by the requesting user equipment to the network slice instance. For example, the AMF may assign and/or insert the stored SMP level value into the "SBI-Message-Priority" section of the message header (e.g., HTTP header) of each identified message traffic packet directed to the network slice instance by the UE. As such, message traffic originating from the user equipment that is directed to the network slice instance is communicated with a priority that corresponds to the priority level indicated by the inserted SMP level value.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 23.501; 3$^{rd}$ Generation Partnership Project; Technical Specification Group Services and System Aspects; System Architecture for the 5G System; Stage 2 (Release 17), V17.1.0 (2021-03)
2. 3GPP TS 23.502; 3$^{rd}$ Generation Partnership Project; Technical Specification Group Services and System Aspects; Procedures for the 5G System; Stage 2 (Release 17), V17.1.0 (2021-03)
3. 3GPP TS 29.531; 3$^{rd}$ Generation Partnership Project; Technical Specification Group Core Network and Terminals; Network Slice Selection Services; Stage 3 (Release 17), V17.1.0 (2021-03)
4. 3GPP TS 28.801; 3$^{rd}$ Generation Partnership Project; Technical Specification Group Services and System Aspects; Telecommunication management; Study on management and orchestration of network slicing for Next Generation Network; (Release 15), V15.1.0 (2018-01)
5. 3GPP TS 28.531; 3$^{rd}$ Generation Partnership Project; Technical Specification Group Services and System Aspects; Management and Orchestration; Provisioning; (Release 16), V16.9.0 (2021-03)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for establishing message priority in network slices based on quality of service (QoS) parameters, the method comprising:

receiving, by a network slice configuration service provider entity and from a network slice management service provider entity, a network slice creation notification message containing at least a QoS profile corresponding to a created network slice;

utilizing the QoS profile to derive a service based interface (SBI) message priority (SMP) level value associated with the network slice; and providing the SMP level value to a requesting access and mobility management function (AMF) entity in response to receiving a network slice selection request message from the AMF entity, wherein the AMF entity assigns the SMP level value to network traffic directed to the network slice.

2. The method of claim 1 wherein the network slice management service provider entity is a network slice management function (NSMF) and the network slice configuration service provider entity is a network slice selection function (NSSF).

3. The method of claim 1 wherein the QoS profile is generated from required QoS parameters provided by a communication service management function (CSMF) entity to network slice management service provider entity.

4. The method of claim 1 wherein the network slice configuration service provider entity includes a mapping table that maps QoS parameters to SMP level values.

5. The method of claim 4 wherein the network slice configuration service provider entity derives the SMP level value by determining a closest match between the QoS parameters in the mapping table and QoS parameters in the QoS profile.

6. The method of claim 1 wherein the SMP level value is provided to the AMF entity in a network slice selection response message.

7. The method of claim 1 wherein the SMP level value is inserted in an SBI message priority section of a header of the network traffic directed to the network slice.

8. A system for establishing message priority in network slices based on quality of service (QoS) parameters, the system comprising:

a network slice configuration service provider entity including at least one processor and a memory; and a priority management engine stored in the memory and implemented by the at least one processor for receiving, from a network slice management service provider entity, a network slice creation notification message containing at least a QoS profile corresponding to a created network slice, utilizing the QoS profile to derive a service based interface (SBI) message priority (SMP) level value associated with the network slice, and providing the SMP to a requesting access and mobility management function (AMF) entity in response to receiving a network slice selection request message from the AMF entity, wherein the AMF entity assigns the SMP level value to network traffic directed to the network slice.

9. The system of claim 8 wherein the network slice management service provider entity is a network slice management function (NSMF) and the network slice configuration service provider entity is a network slice selection function (NSSF).

10. The system of claim 8 wherein the QoS profile is generated from required QoS parameters provided by a communication service management function (CSMF) entity to network slice management service provider entity.

11. The system of claim 8 wherein the network slice configuration service provider entity includes a mapping table that maps QoS parameters to SMP level values.

12. The system of claim 11 wherein the network slice configuration service provider entity derives the SMP level value by determining a closest match between the QoS parameters in the mapping table and QoS parameters in the QoS profile.

13. The system of claim 8 wherein the SMP data is provided to the AMF entity in a network slice selection response message.

14. The system of claim 8 wherein the SMP level value is inserted in an SBI message priority section of a header of the network traffic directed to the network slice.

15. A non-transitory computer readable medium having stored thereon executable instructions that when executed by a processor of a computer control the computer to perform steps comprising:
   receiving, by a network slice configuration service provider entity and from a network slice management service provider entity, a network slice creation notification message containing at least a QoS profile corresponding to a created network slice;
   utilizing the QoS profile to derive a service based interface (SBI) message priority (SMP) level value associated with the network slice; and
   providing the SMP to a requesting access and mobility management function (AMF) entity in response to receiving a network slice selection request message from the AMF entity, wherein the AMF entity assigns the SMP level value to network traffic directed to the network slice.

16. The non-transitory computer readable medium of claim 15 wherein the network slice management service provider entity is a network slice management function (NSMF) and the network slice configuration service provider entity is a network slice selection function (NSSF).

17. The non-transitory computer readable medium of claim 15 wherein the QoS profile is generated from required QoS parameters provided by a communication service management function (CSMF) entity to network slice management service provider entity.

18. The non-transitory computer readable medium of claim 15 wherein the network slice configuration service provider entity includes a mapping table that maps QoS parameters to SMP level values.

19. The non-transitory computer readable medium of claim 15 wherein the network slice configuration service provider entity derives the SMP level value by determining a closest match between the QoS parameters in the mapping table and QoS parameters in the QoS profile.

20. The non-transitory computer readable medium of claim 15 wherein the SMP data is provided to the AMF entity in a network slice selection response message.

* * * * *